(12) United States Patent
Chu et al.

(10) Patent No.: US 8,902,818 B2
(45) Date of Patent: Dec. 2, 2014

(54) SYSTEM FOR COMMUNICATING BETWEEN A NON-CONNECTED EQUIPMENT AND A MANAGEMENT SERVER

(71) Applicant: Sierra Wireless, Issy les Moulineaux (FR)

(72) Inventors: Nhon Chu, Rueil Malmaison (FR); Djelal Raouf, Rueil Malmaison (FR)

(73) Assignee: Sierra Wireless, Issy les Moulineaux (FR)

( * ) Notice: Subject to any disclaimer, the term of this patent is extended or adjusted under 35 U.S.C. 154(b) by 206 days.

(21) Appl. No.: 13/632,219

(22) Filed: Oct. 1, 2012

(65) Prior Publication Data
US 2013/0272195 A1    Oct. 17, 2013

(30) Foreign Application Priority Data
Sep. 30, 2011    (FR) ...................................... 11 58866

(51) Int. Cl.
*H04W 4/00*   (2009.01)
*H04B 7/185*  (2006.01)
*H04J 1/10*   (2006.01)
*H04J 3/08*   (2006.01)

(52) U.S. Cl.
USPC ............ 370/328; 370/316; 370/492; 370/501

(58) Field of Classification Search
CPC ............. H04B 7/2606; H04B 7/18582; H04B 7/18508; H04W 88/04; H04W 80/04; H04W 88/06; H04J 1/10; H04J 1/14; H04J 3/08
USPC ........................... 370/315, 316, 328, 492, 501
See application file for complete search history.

(56) References Cited

U.S. PATENT DOCUMENTS

| | | | |
|---|---|---|---|
| 2006/0271688 A1* | 11/2006 | Viger et al. .................... | 709/227 |
| 2008/0112355 A1* | 5/2008 | Krishnakumar et al. ..... | 370/328 |
| 2009/0073908 A1* | 3/2009 | Cai ................................ | 370/312 |
| 2009/0092067 A1* | 4/2009 | Sudarshan et al. ............ | 370/281 |
| 2010/0117869 A1 | 5/2010 | Rieth et al. | |
| 2010/0166170 A1* | 7/2010 | East et al. ................. | 379/221.01 |
| 2010/0281042 A1 | 11/2010 | Windes et al. | |
| 2011/0177791 A1 | 7/2011 | Staehlin et al. | |
| 2011/0201302 A1 | 8/2011 | Hatton | |
| 2012/0033612 A1* | 2/2012 | Jazra ............................. | 370/328 |
| 2012/0315009 A1* | 12/2012 | Evans et al. ................... | 386/230 |

OTHER PUBLICATIONS

Search Report for French Priority Application No. 11/58866, dated May 8, 2012.

* cited by examiner

*Primary Examiner* — Ronald Abelson
(74) *Attorney, Agent, or Firm* — Nixon & Vanderhye, PC

(57) ABSTRACT

The present invention concerns the field of communication between a server and target devices not connected to a communications network. The context of use is typically the management of a fleet of devices by an operator.

A generic mobile application is described, for relaying messages between these non-connected devices and a management server. This application is intended to operate on a mobile terminal hold by a person moving close to the equipment. The terminal and the equipment are provided with point to point communication means. The terminal communicates with the management server when it is located within range of a communication network. The application makes it possible to store and resend the messages between the moment when the terminal is connected to the communications network and the moment when the terminal is connected to the equipment.

5 Claims, 3 Drawing Sheets

SYSTEM FOR COMMUNICATING BETWEEN A NON-CONNECTED EQUIPMENT AND A MANAGEMENT SERVER

This application claims priority to France Application No. 11/58866, filed Sep. 30, 2011, the entire contents of which is hereby incorporated by reference.

The present invention concerns the field of communications between a server and target devices not connected to a communications network. The context of use is typically the management of a fleet of devices by an operator.

There exist many types of service that involve the deployment of a fleet of devices in locations where they are useful for rendering the service. There can be cited for example a fleet of drink or snack dispensers, bank automatic teller machines, tourist information terminals, urban equipment or the like.

The operators of this equipment have a major advantage in being able to communicate directly with this equipment from a centralised management server. Thus alert messages indicating malfunctioning may be sent directly by the devices and be notified to the operator without delay via the management server. Conversely, it is possible to remotely modify the configuration of the devices and to proceed with adjustments from the management server. Travel of personnel to the site for each intervention is thus avoided. The intervention time is also shortened when the equipment malfunctions.

To do this, it is more and more usual to provide the equipment with communication means enabling it to have access to a communication network, typically the Internet. These communication means may be a connection wired to the network, or a wireless communication link such as a WiFi module if the appliance is covered by a WiFi access point. Some devices are provided with a communication module of mobile telephony type that offers them access to a data network.

However, an operator may be caused to deploy equipment in places not covered by a WiFi network or outside the extent of a mobile telephony network. It may also happen that the cost of these connection means may be disproportionate for some items of equipment and some services. Because of this, items of equipment may be inaccessible for conventional network communications. It is, despite everything, advantageous to allow data exchanges between these unconnected devices and a central service management server.

The invention aims to solve the above problems by proposing a generic mobile application for relaying messages between these unconnected devices and a management server. This application is intended to function on a mobile terminal carried by a person moving close to the equipment. The terminal and the equipment are provided with point to point communication means. The terminal communicates with the management server when it is within the range of a communications network. The application makes it possible to store and return messages between the moment when the terminal is connected to the communications network and the moment when the terminal is connected to the equipment.

The invention concerns a system for communicating between an equipment not connected to a communications network and a management server connected to a communications network, characterised in that:
the non-connected equipment comprises means for transmitting data to a mobile terminal located close by;
the system comprises at least one mobile terminal comprising:
means for receiving data from the non-connected equipment when it is located close by;
means for storing these data;
means for connecting to the communications network;
means for sending said stored data to the management server when the terminal is connected to the communications network.

The invention also concerns an equipment not connected to a communication network intended to communicate in a system as described, which comprises means for transmitting data to a mobile terminal located close by.

According to a particular embodiment of the invention, the means for transmitting data to a mobile terminal located close by comprise means for establishing a point to point communication with said terminal.

According to a particular embodiment of the invention, the means for transmitting data to a mobile terminal located close by comprise means for establishing a communication in broadcast mode, general or multipoint, with said terminal.

The invention also concerns a mobile terminal intended to communicate in a system as described, which comprises means for receiving data from the non-connected equipment when it is located close by; means for storing these data; means for connecting to the communication network and means for sending said stored data to the management server when the terminal is connected to the communications network.

According to a particular embodiment of the invention, the means for receiving data from the non-connected equipment when it is located close by comprise means for establishing a point to point connection with said equipment.

According to a particular embodiment of the invention, the means for receiving data from the non-connected equipment when it is located close by comprise means for establishing a connection in broadcast mode, general or multipoint, with said equipment.

The invention also concerns a method for sending a message by an equipment not connected to a communications network intended to communicate in a system as described, which comprises, for sending a message, a management server connected to a communications network; a step of detecting the proximity of a terminal; a step of establishing a communication with said terminal; a step of sending the message to said terminal and a step of terminating the communication.

The invention also concerns a method for transmitting a message between an equipment not connected to a communications network and a server connected to a communications network by a mobile terminal, which comprises a step of transferring data between the non-connected equipment and the mobile terminal; a step of determining the addressee of the message; a step of storing the message; a step of waiting until the terminal is connected to the communications network; a step of sending the stored message to its addressee when the terminal is connected to the communications network.

According to a particular embodiment of the invention, the data transfer step comprises a step of establishing a point to point connection with said non-connected equipment.

According to a particular embodiment of the invention, the data transfer step comprises a step of establishing a connection in broadcast mode, general or multipoint, with said non-connected equipment.

According to a particular embodiment of the invention, the method also comprises a step of detecting that the message is a message in accordance with the pan-european automatic emergency call system known as eCall and a step of relaying the message thus detected directly to the eCall service.

The invention also concerns a method for sending a message by a management server connected to a communications network to an equipment not connected to the communications network, which comprises a step of selecting a panel of terminals from a set of terminals as described; a step of sending the message to be transmitted to all the terminals in the selected panel and a step of awaiting acknowledgement.

According to a particular embodiment of the invention, the step of selecting the panel is performed on the basis of geolocation information about said terminals.

According to a particular embodiment of the invention, the step of selecting the panel is performed on the basis of a profile of information relating to the holder of said terminal.

According to a particular embodiment of the invention, the communications network is a cellular radio communications network, wherein the step of selecting the panel comprises a step of selecting at least one base station in the cellular network on the basis of its location in the vicinity of the non-connected equipment that is the addressee of the message and a step of sending the message to the selected base stations.

The invention also concerns a method for transmission between a first item of equipment not connected to a communications network and at least one second item of equipment not connected to the communications network, which comprises a step of transmitting a message between said first item of non-connected equipment and a server connected to the communications network as described and a step of transmitting a message by said server connected to the communications network to said at least one item of non-connected equipment as described.

The invention also concerns the base stations in a cellular radio communication network that comprise means for managing a queue of messages intended for mobile terminals and means for sending these messages to the terminals participating in the system that connect to this station.

The features of the invention mentioned above, as well as others, will emerge more clearly from a reading of the following description of an example embodiment, said description being given in relation to the accompanying drawings, among which:

In this document, a non-connected equipment means an equipment managed in a fleet by an operator not having a permanent connection with a communications network such as for example the Internet. This lack of connection may be due to the fact that the equipment does not have means for connecting to the network or to the fact that it is located in a place not covered by a means for accessing to the network.

The invention is based on applications embedded in mobile terminals, typically mobile telephones, hold by a plurality of users. The terminal and the non-connected equipment having to be managed are provided with short-range point to point communication means. These communication means comprise short-range radio links such as Bluetooth or ZigBee standardised by IEEE 802.15.X, the WiFi standard or the near field communication or NFC standard such as RFID (Radio Frequency IDentification) technology. In some embodiments, the communication between the non-connected equipment and the mobile terminal may consist of a simple label, typically a mono-dimensional or bidimensional barcode that can be read by the mobile terminal, typically by means of its embedded camera.

Figure 1:
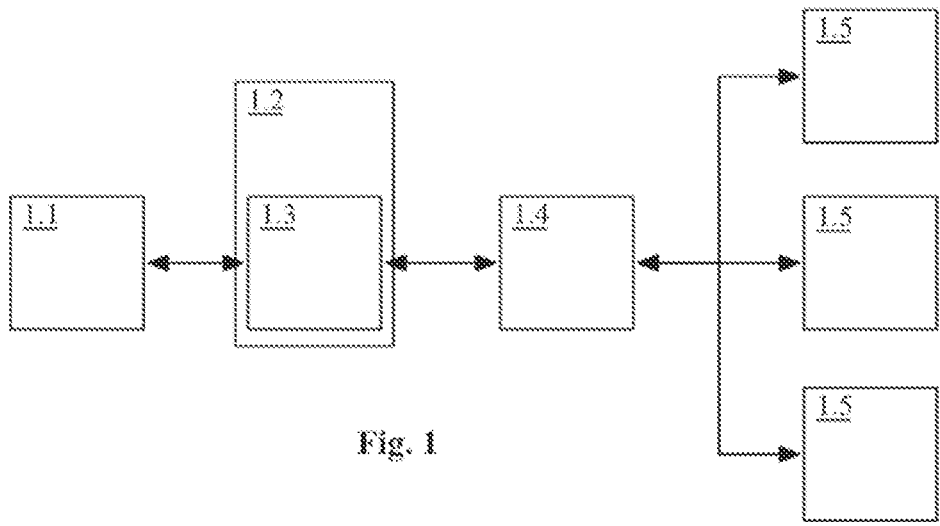
FIG. 1 illustrates the communication architecture of an example embodiment of the invention.

The architecture of the system according to a particular embodiment of the invention is illustrated in FIG. 1. At least one item of non-connected equipment 1.1 is managed by an operator. This management takes place from a management server 1.5. The figure illustrates a plurality of such servers that can manage various fleets of non-connected equipment.

A mobile terminal 1.2 is assumed to accompany a holder, human or vehicle for example, that is moving and is able to change its position close to at least one item of non-connected equipment 1.1. This terminal may consist of any type of electronic apparatus able to host a mobile application 1.3. A smartphone, a tablet, a personal digital assistant (PDA), a games console, a photographic apparatus, a camera, a communicating vehicle, a geolocation apparatus or the like can be cited. The terminal has at least one means for connecting to a communications network, typically the Internet. This means for connecting is not necessarily permanent and its availability may depend on the particular location of the terminal. For example, a mobile telephone accesses the Internet by means of a connection of the data type with an access station of the mobile telephony network. To do this, this telephone must be within radio range of an access station.

The terminal also has means of point to point communication with the non-connected equipment. These means may for example be a Bluetooth interface, a WiFi interface, an NFC interface or a barcode reader. These means make it possible, when the terminal is situated close to the non-connected equipment, to establish a connection for an exchange of data between the non-connected equipment and the terminal.

The terminals and the non-connected equipment may also use communication means in general broadcast mode or in multipoint broadcast mode (multicast), implemented for example with reserved addresses. For example, ZigBee has the address 255 for this function. The IP protocol has reserved addresses for sending messages in general broadcast mode and reserved addresses for sending messages in multipoint broadcast mode.

The terminal also hosts an application 1.3 dedicated to the service. This application is responsible for establishing the connection with the non-connected equipment. It also serves as a relay for the messages exchanged between the non-connected equipment and the management server 1.5. This relay functions asynchronously. That is to say it functions in a store and forward mode. This is because the constraint of the system is the taking account of a non-simultaneous connection of the terminal with, on one hand, the non-connected equipment and, on the other hand, the communications network. When a connection is established with the non-connected equipment on one hand or with the communications network on the other hand, the mobile application exchanges the messages that it has stored. It receives any messages from the equipment or the management server and stores them.

Advantageously, the mobile application manages a user profile that can contain information relating to the use of the system by the user and/or preferences of the user. On the basis of this user profile, the application modifies its behaviour. It is thus possible to manage for example the method for sending messages, which may be sent by means of a data connection or by SMS. It is also possible to manage the data type. For example, the only things that will be transported are messages relating to a service offering commercial compensation to the user, or which relate to a service to which the user has subscribed or the like.

Advantageously, although this is not necessary to the functioning of the invention, a service platform 1.4 functions as a relay between the mobile application 1.3 and the management servers of the various services 1.5. This service platform is accessible by means of the communications network to the service application and can communicate with the various service management servers. It enables services to be implemented such as selective relay according to the context of the same type of message to different servers. It also allows centralised management of any commercial compensations that may be provided for encouraging the holders of the terminal to contribute to the system. It advantageously makes it possible to guide the terminal holders to proximity equipment offering services/promotions. It can also manage provisioning and scalability functionalities related to the quantity of messages exchanged, for example it can perform the aggregation of data which makes it possible to limit the quantity of data exchanged with the management servers. The use of such a service platform makes it possible to mutualise these functions for a plurality of services. However, according to certain embodiments, this platform does not exist and the corresponding functions are implemented in each management server.

When the holder of the mobile terminal approaches a non-connected equipment, a connection is established between the non-connected equipment and the mobile application. The establishment of this connection depends on the communication technology used in the particular embodiment of the invention. Advantageously, this connection is established automatically and transparently for the holder of the mobile terminal. This is possible with Bluetooth, WiFi or NFC technologies. In some embodiments, typically when the communication is based on barcodes, the connection requires the participation of the holder of the mobile terminal. The latter can then trigger the operation of reading the code, which is then transmitted to the mobile application. Would it be by a barcode system or a point to point communication technology, the equipment has means for transmitting data to the terminal located close by.

According to the embodiment, the connection may be at the initiative of the equipment that detects the presence of a mobile application and initiates the connection. In other embodiments, it is the mobile application that detects the presence of the equipment and initiates the connection.

This connection enables an exchange of data between the non-connected equipment and the mobile application. This exchange may be done in the direction equipment to mobile application and/or in the direction mobile application to equipment. Advantageously the communication is bidirectional. However, some embodiments, such as the method based on the reading of barcodes, allow communicating only from the equipment to the mobile application.

When non-connected equipment broadcasts a message in broadcast mode, general or multipoint, to a set of terminals, it advantageously increases the probability that one of these terminals relays the message to the server. When a terminal broadcasts a common message for a set of items of non-connected equipment by broadcast or multicast, this reduces the occupation of the total bandwidth necessary for sending this message to each of the items of non-connected equipment.

Figure 2:
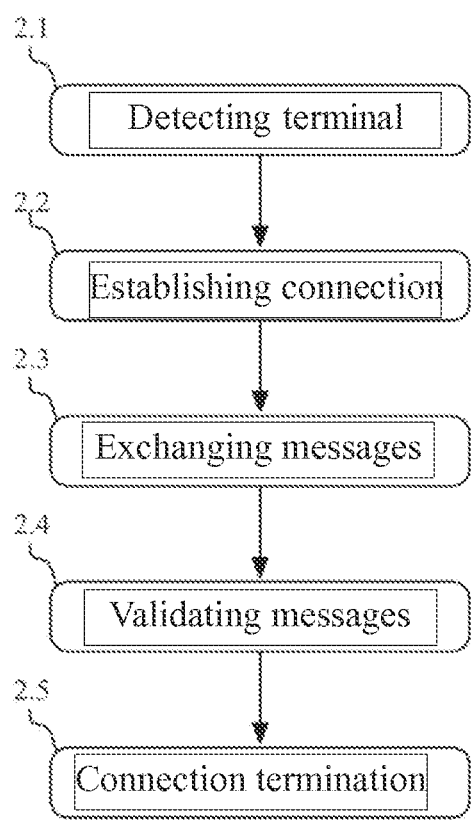
FIG. 2 illustrates the functioning of non-connected equipment when it comes into contact with a terminal hosting a mobile application according to an example embodiment of the invention.

FIG. 2 illustrates the functioning of a non-connected equipment when it comes into contact with a terminal hosting a mobile application according to one embodiment of the invention.

During a step 2.1, the equipment detects the proximity of a terminal equipped with the mobile application. The actual detection may be done either by the non-connected equipment or the mobile application. When the detection is done by the mobile application, the equipment detects the terminal when it receives a request for connection on its part. This detection step is therefore done in accordance with the point to point communication technology used in the embodiment of the invention in question.

During a step 2.2, the connection is established between the non-connected equipment and the terminal This connection step is also performed in accordance with the point to point communication technology used in the embodiment of the invention in question.

During a step 2.3, an exchange of messages occurs between the two items of equipment. Each of the items of equipment has a message queue awaiting transmission. The messages awaiting transmission in the queue of the non-connected equipment are transmitted to the mobile application. Any messages waiting in the mobile application intended for this non-connected equipment are transmitted to it.

Advantageously, a step 2.4 of validating the messages received takes place following their reception. This validation comprises an electronic signature check and any decryption if the messages are encrypted.

During step 2.5, when there are no more messages to be transmitted between the two items of equipment, the connection is closed. It may happen that the connection is closed prematurely before all the messages are transmitted and when, for example, the holder moves away from the equipment before the end of transmission.

Figure 3:
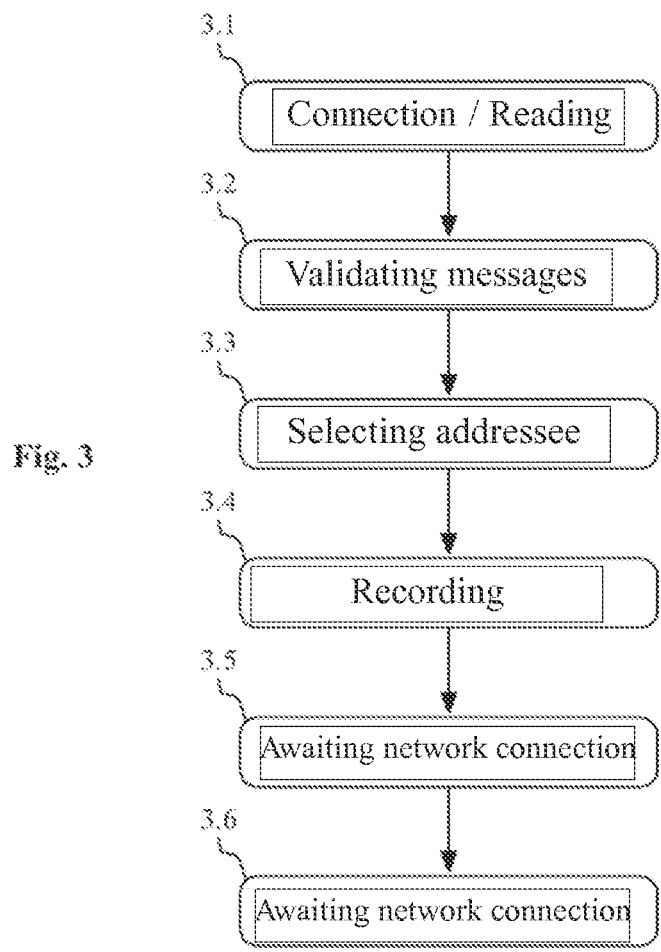
FIG. 3 illustrates the functioning of a mobile application when a connection is established with a non-connected equipment according to an example embodiment of the invention.

FIG. 3 illustrates the functioning of a mobile application when a connection is established with a non-connected equipment according to an example embodiment of the invention.

During a step 3.1 the mobile application establishes a connection with the non-connected equipment. Once the connection is established, the mobile application receives the waiting messages available in the non-connected equipment. In some embodiments based on the reading of barcodes, this connection is replaced by an operation of reading the barcode. In all cases a data transfer step is performed between the non-connected equipment and the mobile application.

Advantageously, the mobile application is provided with means for offering the holder of the terminal an option menu for specifying the message. For example, a drinks dispenser has a barcode containing its identifier. When a malfunction is noted by the holder of a terminal participating in the system, the holder reads the barcode and the mobile application offers to him a menu with a choice of possible malfunctions, requesting him to choose. The message thus uploaded then comprises the identifier of the equipment and the type of malfunction selected.

During a step 3.2, the received messages are advantageously validated. This validation comprises an electronic signature check and any decryption if the messages are encrypted. It is a question of checking that the non-connected equipment is an authentic equipment participating in the system and that it sends messages in accordance with the implemented protocol.

During a step 3.3, the mobile application determines the addressee of the message. This is because the message may be intended for the service platform or directly for one of the management servers. This addressee is identified in the header of the received message.

During a step 3.4, the message is then stored and put in a message queue for sending to the addressee when the communications network becomes available.

During a step 3.5, the mobile application then waits until the terminal is connected to the communications network. Typically this occurs when the holder leaves the vicinity of the equipment and the connection therewith is then cut.

During a step 3.6, the terminal being connected to the communications network, the mobile application sends the waiting messages to their addressees.

It will be noted that the use of this innovative method enables data communications between, on one hand, a non-connected equipment and, on the other hand, management servers. This communication takes advantage of a multitude of terminal holders moving between areas where the terminal has access to a communications network and areas in the vicinity of the non-connected equipment. The terminal, by means of the embedded mobile application, then functions as a mail bearer between the equipment and the management servers. In its most simple embodiments, typically the embodiments based on an exchange of data between the equipment and the terminal using the barcode reader, the communication is monodirectional, from the equipment to the server. In other embodiments based on the establishment of a point to point connection between the non-connected equipment and the terminal, the communication may be bidirectional. It should be noted that, in this case, during the use of message exchanges of the request and response type, it is not necessarily the same terminal that is involved in the exchange of messages. A request may be sent by one of the participants and be carried by a first terminal, while the response will be carried by a second terminal. This is because the communications use the movement, a priori not predictable, of the terminal holders. Advantageously, commercial encouragements may be used to seek a movement of the holder close to an item of equipment with which it is wished to communicate.

Advantageously, the communication may be established between several items of non-connected equipment. This communication may take place in a point to point mode between two items of equipment or in a broadcast mode intended for all the items of equipment of a service or a subset of this equipment Implementation of these inter-equipment communications uses the management server or the service platform as a relay. The message is sent by the sending equipment to this relay, which relays it to the addressee or addressees. For example, a first item of equipment of luminosity sensor type may send to a set of street lamps a message to switch on or off within a public lighting service.

Advantageously, the mobile application is provided with a function of relaying the messages in accordance with the pan-european automatic emergency call system known as eCall. This system aims to enable a car involved in an accident to instantaneously call the emergency services while sending its precise location. It is based on a communication of mobile telephony type. In the case where the vehicle involved in the accident is located in an area not covered by the mobile telephony network, the communication method according to the invention may make it possible to relay the emergency message. For example, the vehicle involved in the accident is here the non-connected equipment. The vehicles passing close by fulfil the role of the mobile terminal. It may also be a case of terminals hold by persons moving close to the accident. The mobile application relays the emergency message as soon as the terminal is connected to the communications network, directly to the eCall service or via a management server dedicated to this service. The mobile application is then provided with means for performing a step of detecting that the message is a message in accordance with the pan-european automatic emergency call system known as eCall and means for performing a step of relaying the message thus detected directly to the eCall service.

The downlink communication, that is to say the one sent by a management server to a non-connected equipment, requires sending messages to a set of terminals able to carry the message close to the equipment in question. A first operational solution consists of sending the message to all the terminals known in the system. In this way, the first terminal passing close to the target non-connected equipment is in a position to transmit the message to it. However, the risk is taken of submerging the terminals, which will all receive all the messages transmitted by the system.

Advantageously, a management server or the service platform will select a reduced panel of terminals with respect to all the terminals. There exist several methods for selecting this panel of terminals.

Figure 4:
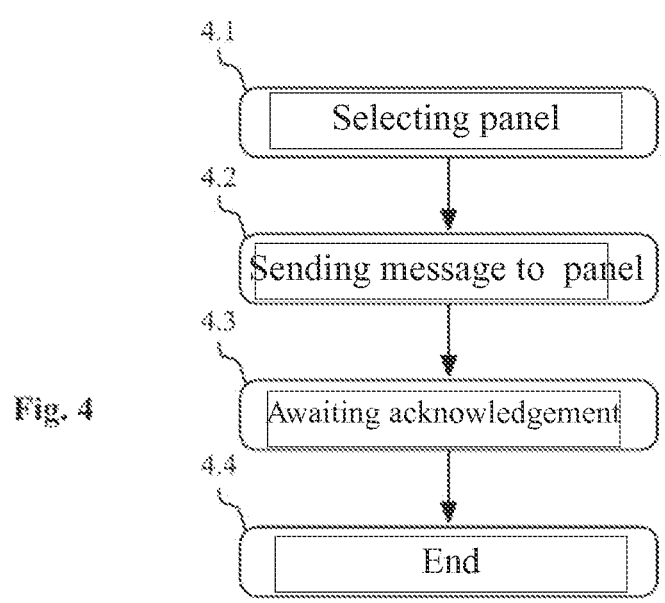
FIG. 4 illustrates the functioning of a management server when it sends a message to an equipment according to an example embodiment of the invention.

The communication then functions according to the method illustrated by FIG. 4.

During a first step 4.1, the server or service platform selects a panel of terminals from the terminals participating in the system. Optionally this selection may consist of returning a panel containing all the terminals, which corresponds to the first embodiment described. Advantageously, the selected panel corresponds to a subset of terminals more likely than the others to come into contact with the target equipment according to the criteria described below.

During a step 4.2, the message intended for the target equipment is then sent to the terminals forming part of the selected panel.

During a step 4.3, the reception of an acknowledgement sent by equipment is advantageously awaited, which makes it possible to know that the message has indeed been transmitted to its addressee before terminating the sending, step 4.4.

According to a first embodiment, the terminals being provided with geolocation means, the server is in a position to determine the terminals moving in the vicinity of the target equipment. These geolocation means comprise the use of a satellite location module, for example: GPS (global positioning system), GLONASS or GALILEO embedded on the terminal, any technique such as locating by triangulation with respect to the base stations within radio range of the terminal or any other geolocation means available on the terminal. These terminals are a priori the terminals likely to approach the target equipment and therefore to come into communication with it. The message intended for the equipment is then sent to this panel on the basis of the location of the terminal.

Another embodiment consists of locating the terminal according to its recent connection/detection with a non-connected equipment of which location is known. For example, a holder is walking in a shopping centre and his terminal detects one or more items of non-connected equipment. These detection events make it possible to locate the holder or even to anticipate his movement if there is a succession of detection events. The management server can then transmit to the terminal messages to be relayed to the equipment located in the vicinity or on the path of the holder. The management server can also send to the holder/terminal commercial information concerning offers available on these items of equipment close by.

According to a second embodiment, the system has information on the holder of the terminal. This information, which is referred to as profile, relates to the movement habits of the holder. It may also comprise information relating to any contractual relationship between the operator of the service and the holder, who will then have agreed to contribute to the system. This profile information may comprise information supplied voluntarily by the holder when subscribing to the service. It may also comprise information accumulated by the mobile application. Typically, when the terminal passes close to an item of equipment, a connection is established with this equipment. During this connection, the mobile application takes cognisance of the identity of the equipment. This information may be accumulated in the profile of the holder. It is then possible to select the terminals belonging to a holder passing regularly close to the target equipment in order to determine the panel of terminals.

Figure 5:
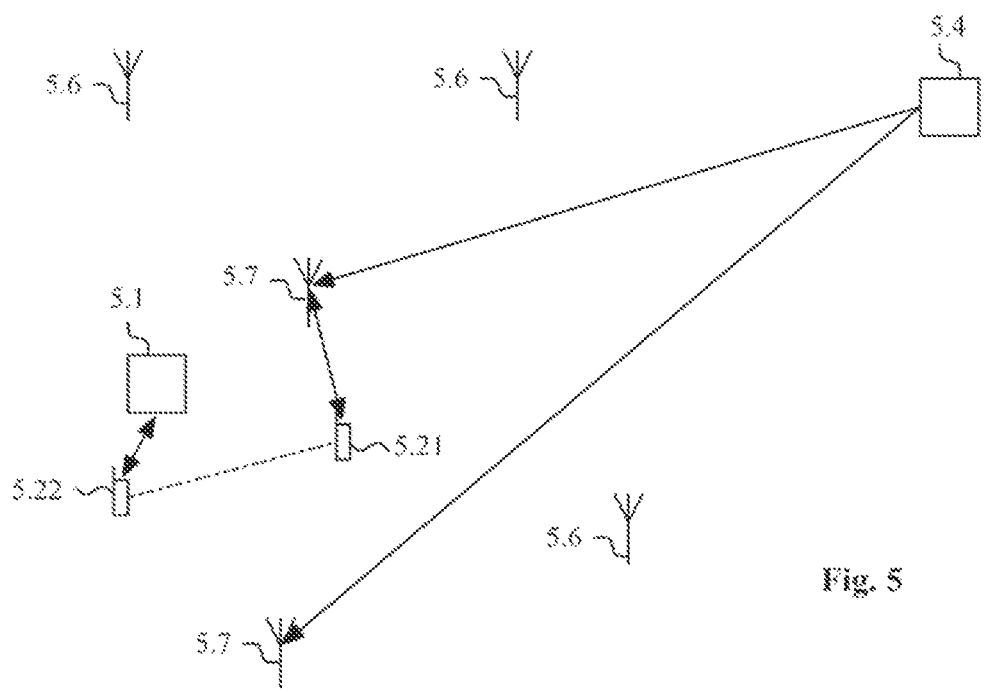
FIG. 5 illustrates a particular embodiment of the sending of a message from a management server to a non-connected equipment.

Alternatively, according to another embodiment, in the case where the communications network used between the servers and the terminal is a cellular radio network. This embodiment is illustrated by FIG. 5. This figure shows a target non-connected equipment 5.1 and a management server, or a service platform, 5.4 that wishes to send a message to the equipment 5.1.

The equipment 5.1 is located in an environment where base stations 5.6 and 5.7 of the cellular radio network are also placed. Some of these base stations 5.7 are identified as being in the vicinity of the target equipment 5.1. The other base stations 5.6 are considered to be further away from the target equipment.

According to this embodiment, the base stations of the cellular ratio network are provided with means for managing a queue of messages intended for mobile terminals as well as means for sending these messages to the terminals participating in the system that is connected to this station.

The management server or the service platform 5.4 then selects the base stations 5.7 in the vicinity of the target equipment and sends to them the message intended for the base equipment. This message is then stored in the base station.

When a terminal 5.21 participating in the system, that is to say hosting a mobile application according to the invention, connects to the base station, the latter, in addition to its normal functioning, sends to it the message intended for the target non-connected equipment.

The terminal then treats this message received from the base station in the same way as the messages received from a management server or a service platform and stores it for subsequent transmission to the equipment.

This terminal 5.21, when it is afterwards in the vicinity 5.22 of the target equipment 5.1, establishes a connection with the latter for submitting the message as already described.

In this case, the step of selecting the panel of terminals is an indirect selection step. This is because the base station or stations of the cellular network are selected on the basis of the location thereof in the vicinity of the non-connected equipment to which the message is intended. The panel will then consist of the terminals connected to these base stations.

This embodiment makes it possible to avoid the direct selection of a panel of terminals for transmitting the message. Use is advantageously made of knowledge of the relative location of the items of non-connected equipment and the base stations in the cellular ratio network in order to use the base stations in the vicinity of the equipment as relays for the messages.

In order to avoid clogging the system with obsolete messages, the messages are advantageously provided with a TTL (time to live). In this way, the various items of equipment managing a queue of messages in the system discard the excessively old messages present in these queues.

As the time that a message will take to be delivered is not controlled, it may be necessary to manage a resending of the messages for which an acknowledgement has not been received. Advantageously, the management server manages a resending time beyond which the sending process recommences. A maximum number of resends may also be managed.

The non-connected equipment, in the embodiments where the communication is bidirectional and therefore the reception of an acknowledgement to a sent message can be expected, will also manage a message resending time.

Advantageously, the message resending time can be calculated dynamically according to certain criteria. Among these criteria, the frequency of connection to a terminal participating in the system can be cited.

To limit the transfer time for a message, the non-connected equipment wishing to send a message will advantageously send this message to a given number of terminals with which it obtains a connection. This is because, by increasing the number of terminals responsible for transmitting the message, the first of these terminals having a connection with the communications network is in a position to deliver the message to the management server. Statistically, the message transfer time is therefore reduced by loading several terminals with the same message.

Advantageously, the number of terminals used by the equipment for sending its message may depend on the frequency of connection of the terminals.

Alternatively, the equipment may also send the same message to all the terminals that are connected during a given period of time. This period of time may also be dynamic according to the frequency of connection.

Advantageously, the equipment may broadcast the same message to all the terminals connected by using a protocol enabling general or multipoint broadcasting, such as IP or ZigBee, by means of reserved addresses.

A sending policy is therefore defined for managing the number of copies of the message sent and the time between two sendings according to criteria aimed at improving the transfer time for a message without clogging the system. These criteria may also take into account the commercial compensation mechanisms and seek to best manage the payment of compensation to the holder of the message, while guaranteeing transmission of the message.

The particular format of the messages may take several forms. Advantageously, for security reasons, authentication by digital signature is established between the various participants in the system. Likewise, encryption of the messages may be implemented.

Figure 6:
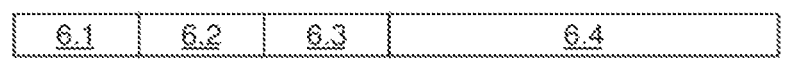
FIG. 6 illustrates the format of the messages according to a particular embodiment of the invention.
Figure 6:
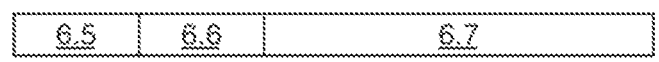
Figure 6:
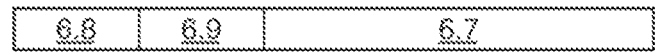
Figure 6:
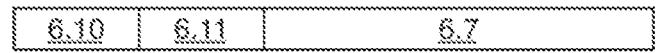

FIG. 6 illustrates a format of the messages in a particular embodiment of the invention.

The first message is the format of a message sent by non-connected equipment to a management server. It contains a header 6.1 containing general information on the equipment originating the message. This header is processed by the mobile application in order to check the validity of the message.

It also contains a part 6.2 that contains additional information on the equipment and on the destination management server and is also processed by the mobile application.

It next contains a part 6.3 that contains additional information on the equipment and on the destination management server intended to be processed by the service platform.

Finally, it contains a part 6.4 that contains the information intended for the management server that is the final destination.

Each participant along the transmission chain, mobile application, service platform, processes the part that are relevant to it and sends the rest of the message to the following participant.

The second message is the illustration of a message created by the management server intended for the service platform. It contains a header 6.5 that contains general information relating to the management server originating the message and is used by the service platform for validating the message. It next contains a part 6.6 that contains information relating to the destination equipment and to the message broadcast strategy, which may comprise information concerning actions relating to the commercial policy associated with the service. This part is processed by the service platform. Finally, it contains the part 6.7 intended for the equipment.

The third message is the illustration of a message created by the service platform intended for the mobile application. It contains a header 6.8 that contains general information relating to the service platform originating the message and is used by the mobile application for validating the message. Next it contains a part 6.6 that contains information relating to the destination equipment to enable the mobile application to identify this destination equipment. This part is processed by the mobile application. Finally, it contains the part 6.7 intended for the equipment.

The fourth message is the illustration of a message created by the mobile application intended for the destination equipment. It contains a header 6.10 that contains general information relating to the mobile application originating the message and is used by the destination equipment for validating the message. Next it contains a part 6.11 that contains supplementary information supplied by the mobile application. Finally, it contains the part 6.7 intended for the equipment.

The invention claimed is:

1. A method for sending a message by a management server connected to a communications network to an equipment not connected to this communication network, wherein the method comprises:
   selecting a panel of terminals from a set of terminals, each terminal being configured for:
   connecting to the communications network;
   receiving the message from the management server when the terminal is connected to the communications network
   storing the message;
   transmitting the message to the non-connected equipment when the non-connected equipment when the non-connected equipment is located close by;
   sending the message to be transmitted to all the terminals in the selected panel, so that the terminal of the selected panel which is the first one passing close to the non-connected equipment transmits the message to the non-connected equipment;
   awaiting an acknowledgement of the message from the non-connected equipment.

2. The method according to claim 1, wherein the step of selecting the panel is performed on the basis of geolocation information on said terminals.

3. The method according to claim 1, wherein the panel selection step is performed on the basis of a profile of information relating to the holder of said terminal.

4. The method according to claim 1, the communication network being a cellular radio communications network, wherein the panel selection step comprises:
   a step of selecting at least one base station in the cellular network on the basis of its location in the vicinity of the non-connected equipment that is the destination of the message;
   a step of sending the message to the selected base station.

5. A method for transmitting between a first item of equipment not connected to a communications network and at least a second item of equipment not connected to this communications network, wherein the method comprises:
   transmitting a message between said first item of non-connected equipment and a server connected to the communications network, comprising:
      transferring data between the non-connected equipment and the mobile terminal;
      determining the addressee of the message;
      storing the message;
      waiting until the terminal is connected to the communications network;
      sending the stored message to its addressee when the terminal is connected to the communications network;
   transmitting a message by said server connected to the communications network to said at least one second item of non-connected equipment.

* * * * *